April 3, 1962  A. F. KOEHLER  3,028,482
CHANGING COLOR DISPLAY DEVICE
Filed Jan. 14, 1959  2 Sheets-Sheet 2
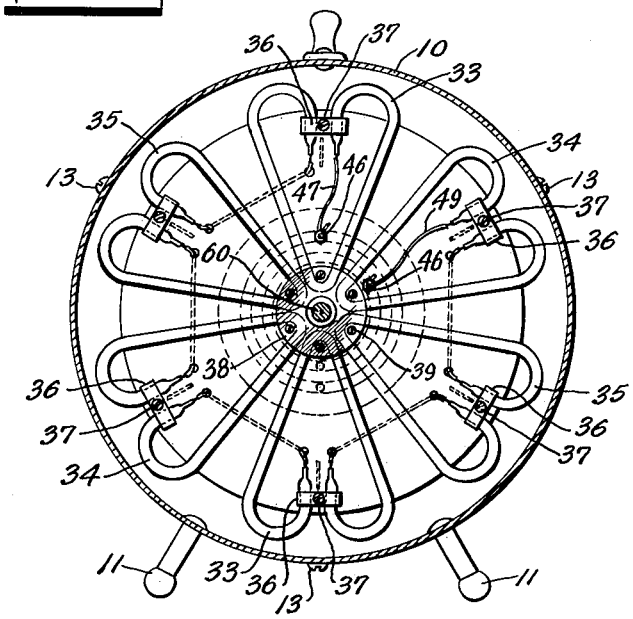
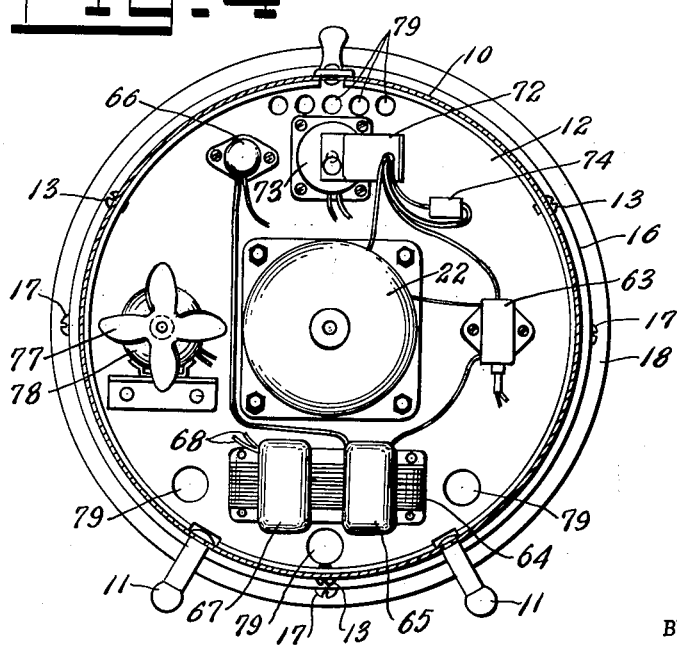
INVENTOR.
ADOLPH F. KOEHLER
BY
*Bohleber, Jasett & Montstream*
ATTORNEYS 3,028,482
CHANGING COLOR DISPLAY DEVICE
Adolph F. Koehler, Riverdale, N.Y. (% Nulite Displays
Co., Inc., 55 34th St., Brooklyn 32, N.Y.)
Filed Jan. 14, 1959, Ser. No. 786,742
1 Claim. (Cl. 240—10.1)

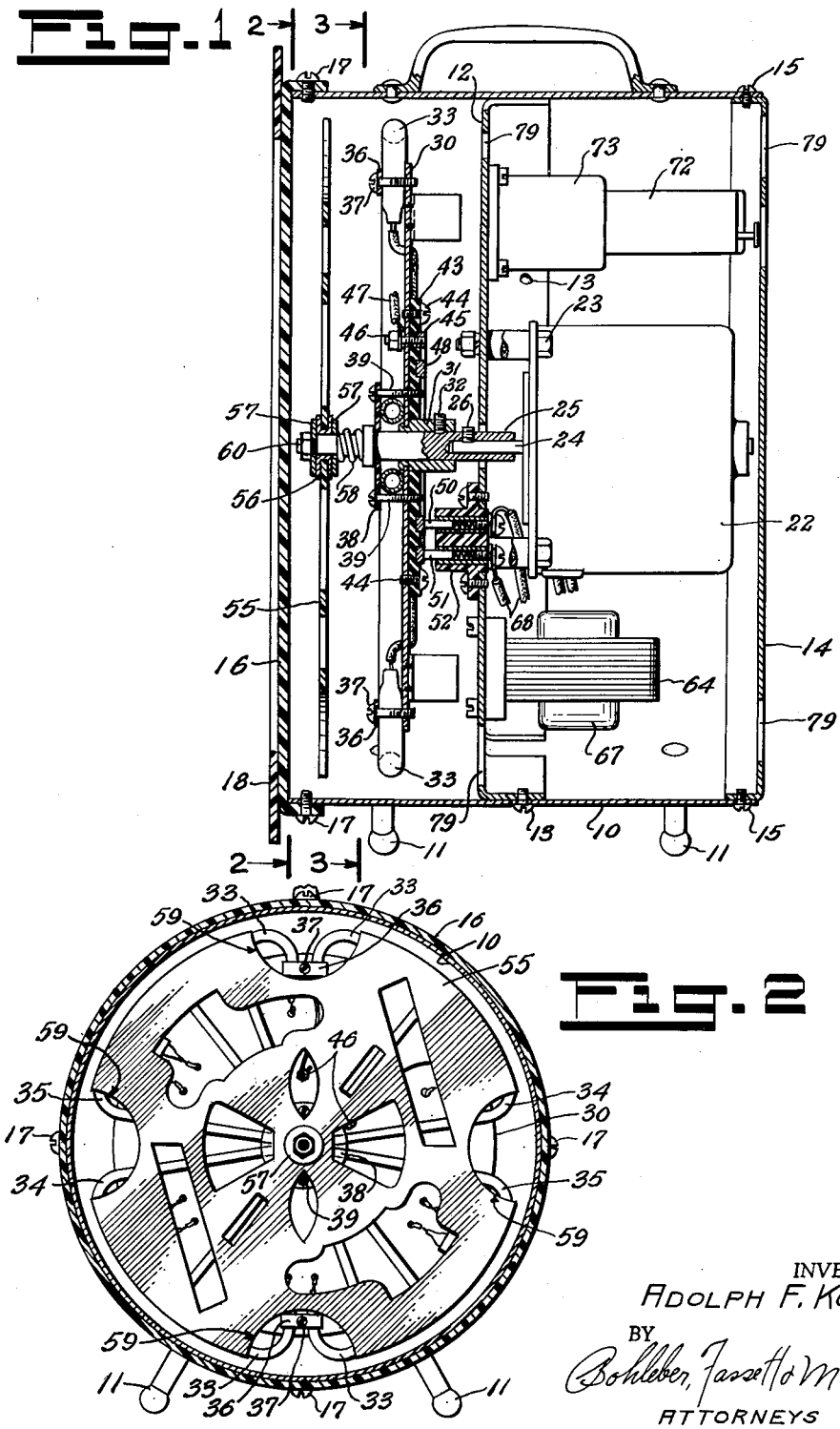

The invention relates to a changing color display device which may be used as an adjunct of advertising displays. The constantly changing colors is attention arresting so that persons passing a window in which goods are displayed are attracted to the window. The display device may also carry an advertising message or firm name as a part of the display device. The device uses gas tubes to produce three different colors which usually will be the fundamental colors red, green and blue. A problem has existed in shipping display devices using gas tubes or tube elements because they are fragile and easily broken in transit. Such devices also could not be shipped with the tubes separately packed since the usual workman could not assemble the tubes into the display device. The display device herein is constructed with a tube unit carrying the tubes which may be separately packed or shipped with ample protection against breakage and the rest of the display device shipped in a usual packing case. The tube unit is so constructed and mounted that it is easily assembled on the display device by any unskilled workman.

It is an object of the invention to construct a new and novel display device which constantly changes color.

Another object is to construct a display device which constantly changes color which is inexpensive to manufacture.

Another object is to construct a display device having gas tubes providing the color and mounted on a unit which is easily assembled from the display device for separate packing or shipping.

Other objects of the invention will be more apparent from the following description when taken in connection with the accompanying drawings illustrating a preferred embodiment thereof in which:

FIG. 1 is a longitudinal section through a part of the display device;

FIG. 2 is an end view of the display device taken on line 2—2 of FIG. 1 showing principally a perforated mask or shield;

FIG. 3 is an end view taken on line 3—3 of FIG. 1 showing the tube array; and

FIG. 4 is an end view of the display device looking in at the rear with the rear cover removed.

The display device has a casing or housing 10, resting on legs 11. The casing is conveniently cylindrical with open ends. A mounting partition 12 is secured with the casing such as by screws 13 threaded into a peripheral flange carried by the partition. The casing and partition serve as a frame for the parts of the device. A rear cover 14 is received at the back or rear of the casing to close the same and is secured thereto by screws 15. A transparent front cover 16 such as of plastic is secured to the casing by screws 17. This front cover may carry advertising indicia thereon or an advertising ring 18 may be provided around the periphery and carry advertising matter thereon, a firm name and the like. This ring is transparent or translucent and/or may have such advertising matter etched into a transparent ring or clearly polished into a translucent ring.

Within the casing is a driving motor 22 and shown as mounted on the partition 12 by bolts 23. The motor has a shaft 24 on which the lighting tube unit is mounted. The mounting particularly shown is an extension 25 having a hole to receive the shaft end which extension is secured to the shaft by a screw 26.

A tube or light plate 30 having a hub 31 is mounted on the extension 25 and secured thereto such as by a screw 32. A tube plate has a plurality of lights of different colors such as gas tubes 33, 34 and 35 mounted thereon shown generally bent into a heart shape although they may be any suitable form. Oppositely disposed tubes 33 are of one color, the oppositely disposed tubes 34 are of one color but different from the color of tubes 33 and the oppositely disposed tubes 35 are of the same color but of a different color from that of tubes 33 and 34. The colors will usually be the fundamental colors although they need not be. Also, although two tubes are shown for each color, it is clear that one or more tubes may be used as desired. A tube unit of two or more colors will give changing colors although a two color unit will not give colors of the whole rainbow. The tubes may be mounted on the tube plate in any convenient manner and the mounting illustrated includes a bar 36 for each tube having a screw 37 passing therethrough between the tube ends and threaded into the tube plate. This bar secures the adjacent ends of one tube to the plate. The central ends of all of the tubes are secured to the tube plate by a disk 38 with a screw 39 therethrough located within the bend of each tube. The disk 38 is desirably transparent so that there is no loss of any color radiation from the tubes. The tubes are electrically connected in series.

An electrical light connection is made with the lights or tubes through slip ring means including slip rings which may take many forms that illustrated including an insulating slip ring plate 43 which is shown secured to the tube plate 30 by screws 44 to rotate therewith. A slip ring 45 is secured to the slip ring plate such as by a bolt or screw 46 aided by a groove in the plate. The bolt 46 may also serve to make electrical connection through a wire 47 with one end of the string of tubes. A second slip ring 48 is also secured to the insulating slip ring plate 43 by a like bolt 46 and is suitably connected electrically with the other end of the string of series connected tubes by a wire 49. Electrical connection is made with the slip rings 48 and 45 through brush means including a brush 50 contacting slip ring 48 and brush 51 contacting the slip ring 45. The brushes are suitably mounted in a brush holder 52 which is secured to a fixed part such as the partition. It is clear that the brushes and brush holder may be mounted on the light plate 30 and the slip rings 45, 48 mounted on a fixed part and preferably on the partition or frame. In other words the slip rings are mounted upon one of the parts including the light plate or partition and the brush holder and brushes are mounted on the other part.

Mounted on the extension 25 is a perforated masking plate or shield 55 which is frictionally driven by the driving motor from the extension through a frictional drive connection or means. The frictional drive connection shown includes a center ring 56 secured to the shield and a friction or metal washer 57 on each side thereof and pressed together by a spring 58 carried on the extension 25. A nut 60 on the end of the extension retains the shield thereon. The shield or masking disk 55 has openings or perforations therethrough of different shapes and preferably each opening has a counterpart diagrammatically opposite therefrom and equidistance from the center. Peripheral cut-outs 59 direct light to the advertising ring 18. Various shapes of perforations aid in securing different blending of colors.

On the back face of the partition is a connection box 63 to which an extension wire is run and from which connections are made to the various electrical units or parts of the display device as will be described. Connection is made to the primary winding 65 of a transformer 64. A resistor 66 also mounted on the partition is connected in series with the primary winding to form a ballast resistor for the gas tubes. The secondary winding 67 is connected to the brushes 50 and 51 through wires 68. With the six tubes shown connected in series the output voltage of the secondary winding is approximately 3,000 volts.

The motor 22 is connected with a power supply through a power circuit including timer switch 72. Such timer switches are purchasable and well known and may have an electric timer motor 73 which drives the timer switch at relatively slow speed such as 10 r.p.m. The open circuit condition is short enough so that the drive motor does not come to a standstill. The timer switch with or without a timer motor constitutes timer switch means. A condenser 74 is customarily provided across the switch contacts to avoid or minimize sparking. This timer switch closes and opens the power circuit to the motor so that the motor speeds up and if the timer switch is on long enough brings the motor up to rated speed and when the timer switch opens the motor slows down until the next contact again connects the drive motor with the power supply. It is understood that one of the timer switch contacts may be relatively short so that the motor does not reach full speed before the switch is opened. As an illustration the timer switch actually used has three contacts of different lengths and of different spacing between contacts so that the motor circuit is opened and closed three times in its cycle and the duration for which power was supplied to the motor is varied three times for each timer cycle. There are a host of different timer switches available for purchase.

The purpose of constantly connecting and disconnecting the motor from the power supply is to change motor speed which shifts the position of the frictionally connected masking plate or shield 55. When the switch is opened the driving motor is shut off and slows down, however, the inertia of the shield tends to continue its speed of rotation for a moment which advances the same to a new position relatively to the tubes and similarly when power is again connected with the motor so that it speeds up, the shield shifts its position on the extension through the friction connecting means. As a consequence the openings in the shield are constantly changing their position with respect to the color tubes and the tubes which show through the particular openings either provides the color of that tube or if two tubes appear in the opening then there is a blend of these two colors. In this way an infinite number of color changes occur viewed through the transparent cover 16. The shield is not constantly changing its position with respect to the tubes but will rotate for a period without change and then it will shift and a different color design is produced in the new position. Some change of colors occurs by virtue of the changing speed of the driving motor, that is, at relatively low speeds of the driving motor the individual colors tend to show up. At high speeds the colors will blend. Another factor which has an effect upon the color and change is the stroboscopic effect of the eye which at a certain speed appears to make the individual tube colors to appear. Without the perforated shield there are speeds at which the colors appear to rotate clockwise and at other speeds appear to rotate counterclockwise. This effect is partially observed with the shield in place. All of these factors have some effect on the color display but the primary one is that caused by the constant changing position of the perforated shield.

In order to keep the display device cool a fan 77 may be provided driven by a motor 78 and electrically connected with the connected box 63. Holes 79 may be provided through the partition and rear cover for drawing in outside air and for permitting circulation of air through the casing.

The various units of the display device including the motor transformer, the timer switch means, the brush holder, the fan, and the connection box are mounted on the partition 12 so that after removal of the extension 31 from the motor shaft with the light plate and shield, all of the units may be removed by withdrawing the partition from the casing. Assembly and replacement of parts is greatly facilitated with this construction.

This invention is presented to fill a need for improvements in a changing color display device. It is understood that various modifications in structure, as well as changes in mode of operation, assembly, and manner of use, may and often do occur to those skilled in the art, especially after benefiting from the teachings of an invention. This disclosure illustrates the preferred means of embodying the invention in useful form.

What is claimed is:

A display device which changes color comprising a frame, a driving motor mounted on the frame and having a shaft, a light plate connected with the motor shaft and rotated by the driving motor, at least two lights each of a different color mounted on the light plate; an electrical light connection for the lights including slip ring means secured to one of the parts including the light plate and the frame, and brush means carried by the other part and engaging the slip ring means; a shield having openings therethrough and mounted for rotation in front of the light plate, a frictional driving connection between the driving motor and the shield, and a power circuit connected with the driving motor comprising a timer switch means including a timer switch to open and close and in series with the motor and being the sole electrical feed connection therewith to completely cut off power to the motor when open, the switch opening the power circuit at relatively short spaced intervals of a duration so that the driving motor changes speed substantially to change the position of the shield relatively to the lights including an extension removably secured on the motor shaft and in which the light plate and shield are mounted on the extension, an electrical connection to the lights comprising a pair of slip rings carried by one of the parts including the light plate and the frame and a brush for each slip ring carried by the other part, the slip rings being spaced radially from each other with respect to the extension, the brushes being directed axially with respect to the motor shaft and radially spaced and spaced the same distance as the slip rings to engage the latter when the extension is attached to the motor shaft.

References Cited in the file of this patent
UNITED STATES PATENTS

| | | |
|---|---|---|
| 1,803,596 | Craig | May 5, 1931 |
| 2,005,420 | Hall | June 18, 1935 |
| 2,138,803 | Dorn | Nov. 29, 1938 |
| 2,147,232 | Ballew | Feb. 14, 1939 |
| 2,155,618 | Roberts | Apr. 25, 1939 |
| 2,281,790 | Newhall | May 5, 1942 |